(12) United States Patent
Mast (10) Patent No.: US 7,044,251 B2
(45) Date of Patent: May 16, 2006

(54) VEHICLE CONVERSION APPARATUS AND METHOD

(75) Inventor: Gerald H. Mast, 5555 S. Sconce Rd., Hubbard, OR (US) 97032

(73) Assignee: Gerald H. Mast, Hubbard, OR (US)

(*) Notice: Subject to any disclaimer, the term of this patent is extended or adjusted under 35 U.S.C. 154(b) by 379 days.

(21) Appl. No.: 10/460,804

(22) Filed: Jun. 11, 2003

(65) Prior Publication Data
US 2004/0000771 A1    Jan. 1, 2004

Related U.S. Application Data

(60) Provisional application No. 60/388,246, filed on Jun. 12, 2002.

(51) Int. Cl.
*B62D 61/00* (2006.01)

(52) U.S. Cl. ............... 180/209; 180/21; 280/755; 280/781

(58) Field of Classification Search ............ 180/21, 180/209; 280/781, 785, 790, 755
See application file for complete search history.

(56) References Cited

U.S. PATENT DOCUMENTS

| | | | |
|---|---|---|---|
| 1,199,194 A | * | 9/1916 | Lee ................ 180/210 |
| 1,334,475 A | * | 3/1920 | Weaver ............ 180/209 |
| 2,854,084 A | * | 9/1958 | Isaac ............... 180/209 |
| 3,154,164 A | | 10/1964 | Shaw et al. |
| 4,350,222 A | | 9/1982 | Lutteke et al. |
| 4,619,340 A | | 10/1986 | Elmer et al. |
| 4,784,324 A | | 11/1988 | DeWitt et al. |
| 5,002,227 A | | 3/1991 | Ehrenberg |
| 5,039,129 A | | 8/1991 | Balmer |
| 5,046,579 A | | 9/1991 | Anderson |
| 5,901,800 A | | 5/1999 | Wilson et al. |
| 6,139,045 A | | 10/2000 | Vandenbark et al. |

* cited by examiner

*Primary Examiner*—Eric Culbreth
(74) *Attorney, Agent, or Firm*—Alleman Hall McCoy Russell & Tuttle LLP (57) ABSTRACT

A conversion apparatus for attachment to a vehicle is provided. The conversion apparatus may include a frame having a mounting assembly adapted to releasably couple the conversion apparatus to the vehicle, and a first extension and a second extension, where each extension laterally extends from the mounting assembly on opposing sides of the vehicle. The frame further includes a first support member extending from the first extension to form a first pocket between the vehicle and the first support member, and a second support member extending from the second extension to form a second pocket between the vehicle and the second support member.

26 Claims, 5 Drawing Sheets

VEHICLE CONVERSION APPARATUS AND METHOD

CROSS REFERENCE TO RELATED APPLICATIONS

This application claims priority under 35 U.S.C. § 119(e) to U.S. Provisional Patent Application No. 60/388,246 of Gerald H. Mast entitled "Tractor Conversion Apparatus and Method," filed Jun. 12, 2002, the disclosure of which is incorporated herein by reference.

TECHNICAL FIELD

The present invention relates to vehicles. More specifically, the present invention relates to apparatus for agricultural vehicles, and includes an apparatus, method, and system for converting a conventional vehicle into a specialized vehicle for tending high-clearance crops, such as Christmas trees, vineyards, berries, and nursery stocks.

BACKGROUND

With various types of vehicles, especially agricultural vehicles, such as tractors, it is desirable to be able to adjust the spacing between the outer extremities of the vehicle and/or to attach peripheral equipment that can tend the crops on either or both sides of the vehicle. Such adjustable vehicles may be used, for example, as mowers, crop sprayers, and/or fertilizers, with some portion of the vehicle moving along a single crop row, and another portion extended from the central axis of locomotion, so as to pass over the adjacent crops or crop rows.

Previous embodiments of such vehicles exist in which the main body of the vehicle, including both the front and rear wheels, remain in their original configuration, with an apparatus attached that extends upwards and/or outwards from the central part of the vehicle in order to apply the desired treatment to adjacent crop rows. Such embodiments have the disadvantage that the modified vehicle has the same width on the ground as the original width of the vehicle, making it difficult or impossible to operate within narrowly-spaced crop rows.

Other tractors include frames whereby the entire body of the tractor is in a raised position. Such high-clearance tractors are configured to pass over crops and treat them as desired. However, such high-clearance tractors may be cumbersome to operate since they typically have a large-turning radius. Moreover, such vehicles are typically unstable due to their raised center of gravity. Additionally, such high-clearance tractors are often cost prohibitive to the typically user.

SUMMARY

A conversion apparatus for attachment to a vehicle is provided. The conversion apparatus may include a frame having a mounting assembly adapted to releasably couple the conversion apparatus to the vehicle. The frame also may include a first extension and a second extension, where each extension laterally extends from the mounting assembly on opposing sides of the vehicle. The frame further includes a first support member extending from the first extension to form a first pocket between the vehicle and the first support member, and a second support member extending from the second extension to form a second pocket between the vehicle and the second support member.

DETAILED DESCRIPTION

Figure 1:
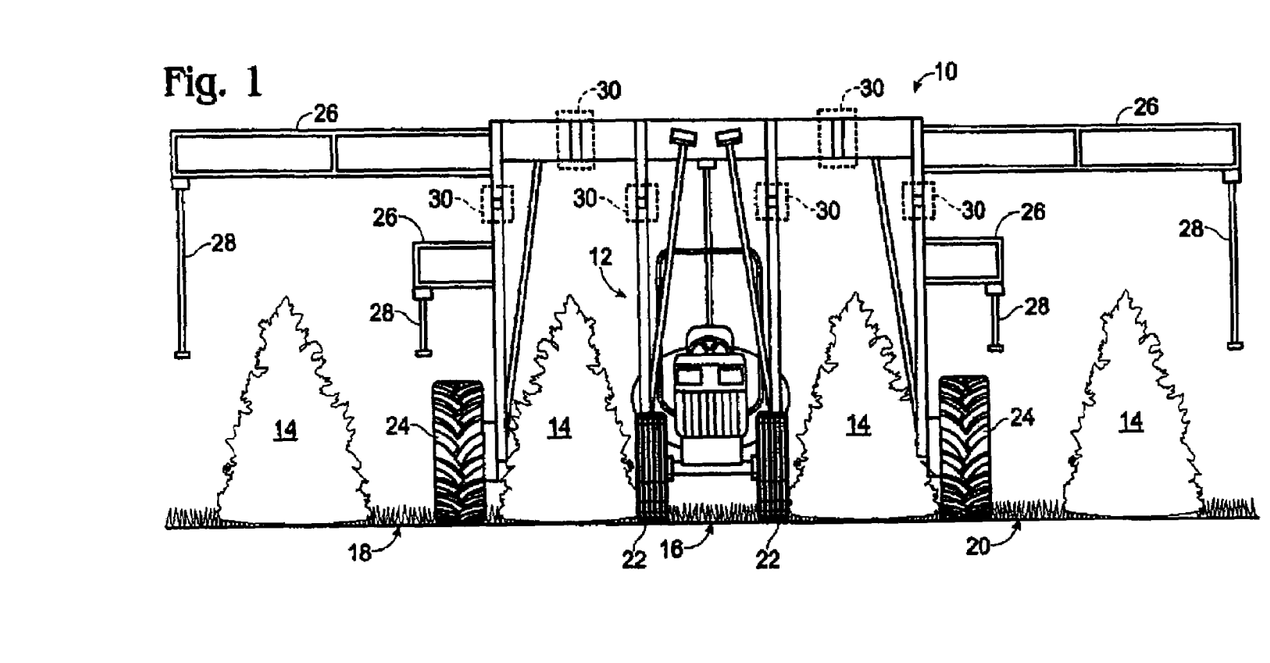
FIG. 1 is a front view of a combination vehicle and conversion apparatus according to an embodiment of the present invention.

Referring initially to FIG. 1, an exemplary conversion apparatus 10 may be adapted to be attached to a vehicle 12. As described in more detail below, vehicle 12 may be converted to a specialty vehicle for tending high-clearance crops by coupling conversion apparatus 10 to vehicle 12. Vehicle 12 may be a tractor, or other suitable vehicle, including, but not limited to compact tractors, lawn tractors, riding-mowers, utility vehicles and tractors, agricultural and farm vehicles, etc.

Typically, conversion apparatus 10 may be attached to vehicle 12 in order to treat and care for high-clearance crops. High-clearance crops may include, but are not limited to, Christmas trees (shown at 14 in FIG. 1), vineyards, berries, nursery stocks, etc. It should be appreciated that the conversion apparatus described herein may be used in other types of crop fields and crops, including, low-lying crops, such as strawberries, soybeans, grass, wheat, etc. Moreover, the stability of the combination conversion apparatus and vehicle may enable the vehicle to be used in a wide variety of settings, including use on hilly fields, use on uneven terrain, and so forth. Conversion apparatus 10, when coupled to a vehicle 12, may be used for a variety of applications, including fertilizing, spraying, mowing, cultivating, etc.

Conversion apparatus 10 may be coupled to vehicle 12 such that vehicle 12 may be configured to travel down a central row 16, while a portion of conversion apparatus 10 is configured to travel down outside rows 18 and 20. Thus, conversion apparatus 10 may be adapted to enable a vehicle to travel along a central crop row, while providing a means for spraying, fertilizing, cultivating, or otherwise treating adjacent crop rows. Outside rows 18, 20 may be adjacent to central row 16, or in some embodiments, outside rows 18, 20 may be spaced one or more rows from central row 16.

In one configuration of the combination vehicle and conversion apparatus, front wheel or wheels 22 of vehicle 12 may be configured to travel down a first row 16 and rear wheels 24 may be attached to conversion apparatus 10 such that rear wheels 24 travel down rows 18, 20 on opposing sides of first row 16. Such a configuration enables the use of a vehicle, which prior to displacement of rear wheels 24, would be difficult to squeeze within row 16.

Conversion apparatus 10 may include accessory extensions 26, or booms, adapted to receive one or more crop application attachments (or accessories) 28. Accessories 28 may be selectively attachable/detachable from accessory extensions 26, or may be integrated within accessory extensions 26. Accessories 28 may include devices adapted to spray, fertilize, water, cultivate, etc. The accessories may be disposed in a plurality of positions on conversion apparatus 10. For example, the accessories may be overhead spraying devices, side-spraying devices, downwardly-extending spraying devices, etc. Both accessory extensions 26 and accessories 28 may be retractable from an operating position. For example, accessory extensions 26 and/or accessories 28 may be foldable or telescoping such that the extensions may be stored in a compact position on conversion apparatus 10 when not in use. Such accessory extensions may be manually-positioned, hydraulically-positioned, or electrically actuated or positioned depending on the configuration of the conversion apparatus.

In some embodiments, the height and width of conversion apparatus 10 may be selectively adjusted to accommodate the size and height of crops 14 and/or rows 16, 18, 20. For example, depending on the type of crop, more or less clearance space may be needed from the ground surface or from the vehicle. For example, mature Christmas trees may require more vertical clearance space than young, newly planted Christmas trees. Moreover, some crop rows may be spaced closer or further away depending on the crop type, the ground type, planter's preferences, etc. Adjustment features 30 may be provided on conversion apparatus 10 to enable a user to selectively adjust the height of the conversion apparatus relative to the ground surface. Adjustment features 30 may further enable a user to adjust the width of the conversion apparatus relative to the vehicle. Adjustment features 30 may be telescoping components, or other retraction/expansion components that allow selective positioning of the height and/or the width of the conversion apparatus.

In some embodiments, detents or other types of locking mechanisms may be used to secure conversion apparatus 10 in a desired position relative to the ground surface and/or to vehicle 12. For example, conversion apparatus 10 may be laterally extended and secured such that conversion apparatus 10 is maintained a select distance from vehicle 12. Such adjustment may enable a user to adapt conversion apparatus 10 to fields having different row spacings. As discussed above, conversion apparatus 10 may also be vertically adjusted from the ground surface to provide for a higher or lower clearance depending on application type, crop type, etc.

Figure 2:
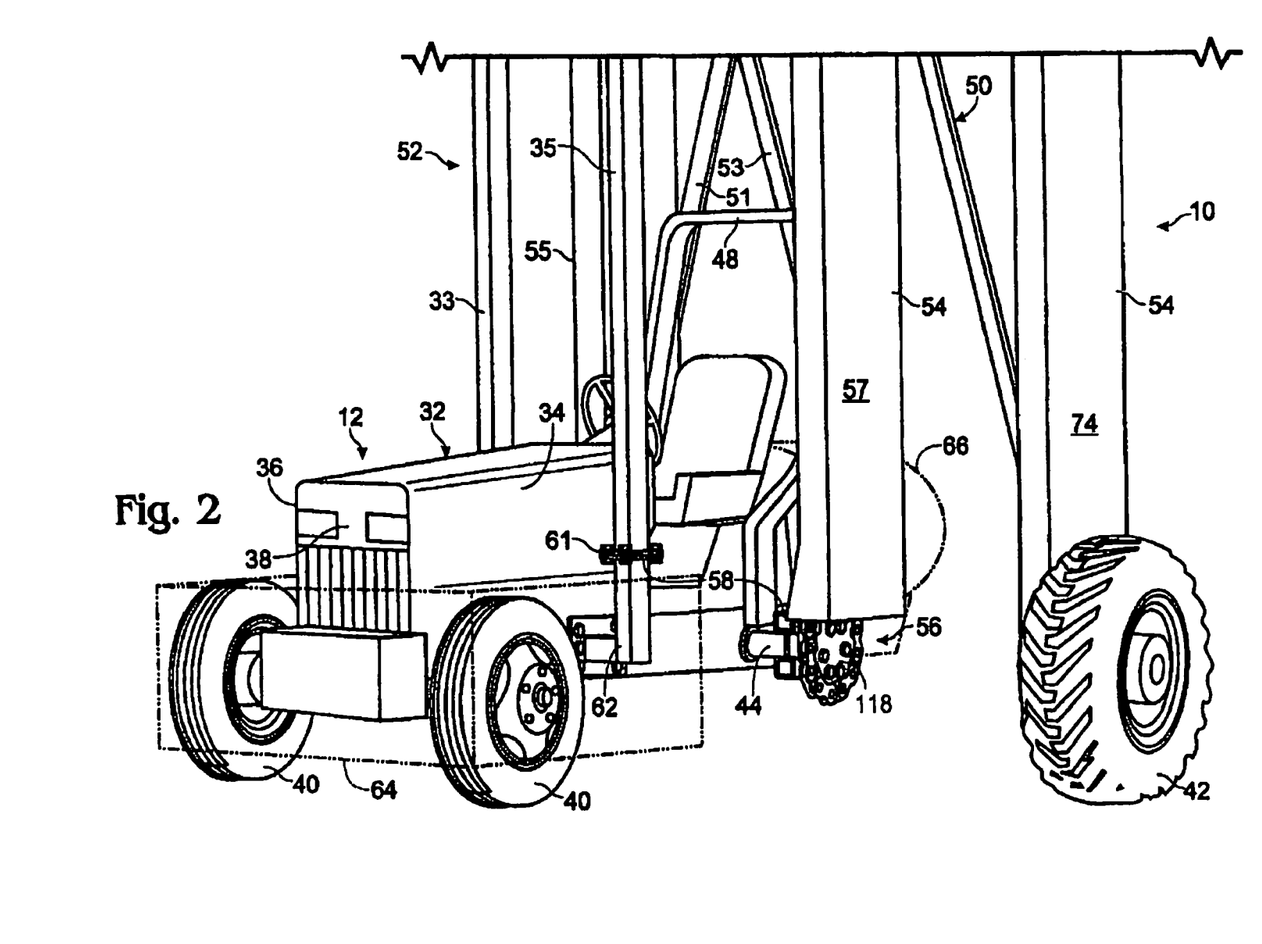
FIG. 2 is a front perspective view of the combination vehicle and conversion apparatus shown in FIG. 1, further illustrating the addition of a front shield.

As shown in FIG. 2 vehicle 12 typically includes a body 32 including opposing sides 34 and 36 and a front 38. Body 32 also may include one or more front wheels 40 and rear wheels 42 (only one which is shown in FIG. 2). Rear wheels 42 may also be referred to as first and second rear wheels. Rear wheels 42 are typically driven wheels, however it is possible that the front wheels may be the driven wheels, or that both the front wheels and rear wheels, or combination thereof, are the driven wheels. The drive assembly may include, but is not limited to a drive mechanism, a rear axle 44 and rear wheel hubs (shown as 102 in FIGS. 4 and 6).

Vehicle 12 may be gas-powered, battery-powered, etc. Typically, vehicle 12 includes a power assembly, a motor assembly and a drive assembly. The power assembly may be configured to power the drive assembly and the motor assembly. In some embodiments, body 32 of vehicle 12 also may include a rollover protection system 48.

Typically, conversion apparatus 10 includes a frame 50 that may be selectively attached/detached to vehicle 12. Frame 50 may include a front portion 52 and a rear portion 54. Front portion 52 may include front braces 33, 35, while rear portion 54 may include mounting members 55, 57 and support members 72, 74, all of which are described in more detail below. In one configuration, conversion apparatus 10 may be configured to be coupled to vehicle 12 such that frame 50 straddles vehicle 12.

Frame 50 may include a plurality of mounting members, support portions and braces. For example, frame 50 may include mounting members 55, 57 adapted to be coupled to vehicle 12. Mounting members may be considered a mounting assembly and it should be appreciated that a single mounting member may be used, instead of plural mounting members. Frame 50 may further include support members 72 (not shown in FIG. 2), 74 and diagonal braces. Additionally, front braces 33, 35 may be used to attach the front of conversion apparatus 10 to vehicle 12. Similarly, braces, such as those illustrated at 53, 51, may be integrated within conversion apparatus 10 providing greater support to the overall structure and enabling additional attachment points for coupling of conversion apparatus 10 to vehicle 12.

As mentioned above, mounting members 55, 57 of conversion apparatus 10 may be configured to be coupled via a coupling mechanism to vehicle 12, as indicated at 56. Coupling mechanism 56 may include one or more fasteners 58, which may be used to operatively connect and releasably secure conversion apparatus 10 to vehicle 12. It should be appreciated that any suitable arrangement and mechanisms may be used as coupling mechanism 56 such that conversion apparatus is releasably secured to vehicle 12.

In the illustrated embodiment, the coupling mechanism 56 may be adapted to operatively connect conversion apparatus 10 with one of the axles of vehicle 12, such as rear axle 44. Fasteners 58, such as a bolt 60, screw, or plurality of bolts or screws, may be used to secure mounting members 55, 57 to vehicle 12 (such as chain sprocket or wheel sprocket 118 to rear axle 44). It should be appreciated that fasteners 58 may mount on either, or both, front portion 52 or rear portion 54 of frame 48 and may couple conversion apparatus 10 to opposing sides 34 and 36, front 38, rollover protection system 48, or a loader-mount portion of vehicle 12 instead of, or in addition to, the rear axle. For example, the mounting members 55, 57 may be attached directly to a rollover protection system 48 as indicated at 65 and 67 in FIG. 3.

Referring back to the embodiment shown in FIG. 2, front braces 33, 35 of conversion apparatus may be secured to the side portion of vehicle 12, as indicated at 61. It should be noted that a bracket 62 may be provided that extends from vehicle 12 and is adapted to receive front braces 33, 35. In some embodiments, the bracket may be integrated within vehicle 12 or may be integrated Within front braces 33, 35. Although illustrated on only one side of vehicle 12, it should be appreciated that a similar arrangement may be disposed on the opposing side of vehicle 12.

In some embodiments, frame 50 may include a shield 64, or guard, extending across at least a portion of front 38 of vehicle 12. Shield 64 may be removably secured to frame 50, as shown by dashed lines in FIG. 2. In some embodiments, shield 64 may be permanently attached to frame 50. Any conventional fastener may be used to couple the shield to the frame. Shield 64 also may be coupled to vehicle 12 through any suitable fastening mechanisms, including bolts, clamps, screws, etc. Shield 64 may clear the path for vehicle 12 as the vehicle travels along a crop row.

Typically, conversion apparatus 10 does not preclude attachment of standard implements to vehicle 12, and thus, vehicle 12 may be used for conventional uses. For example, spraying tanks 66, shown by dashed lines in FIG. 2, as well as mowers, cultivators, etc., may be attached to vehicle 12 regardless of the attachment of conversion assembly 10. In some embodiments, such implements may be attached directly to vehicle 12 without using conventional attachment lifts. It further should be noted that in some embodiments, the standard implements may be attached to conversion apparatus 10.

Figure 3:
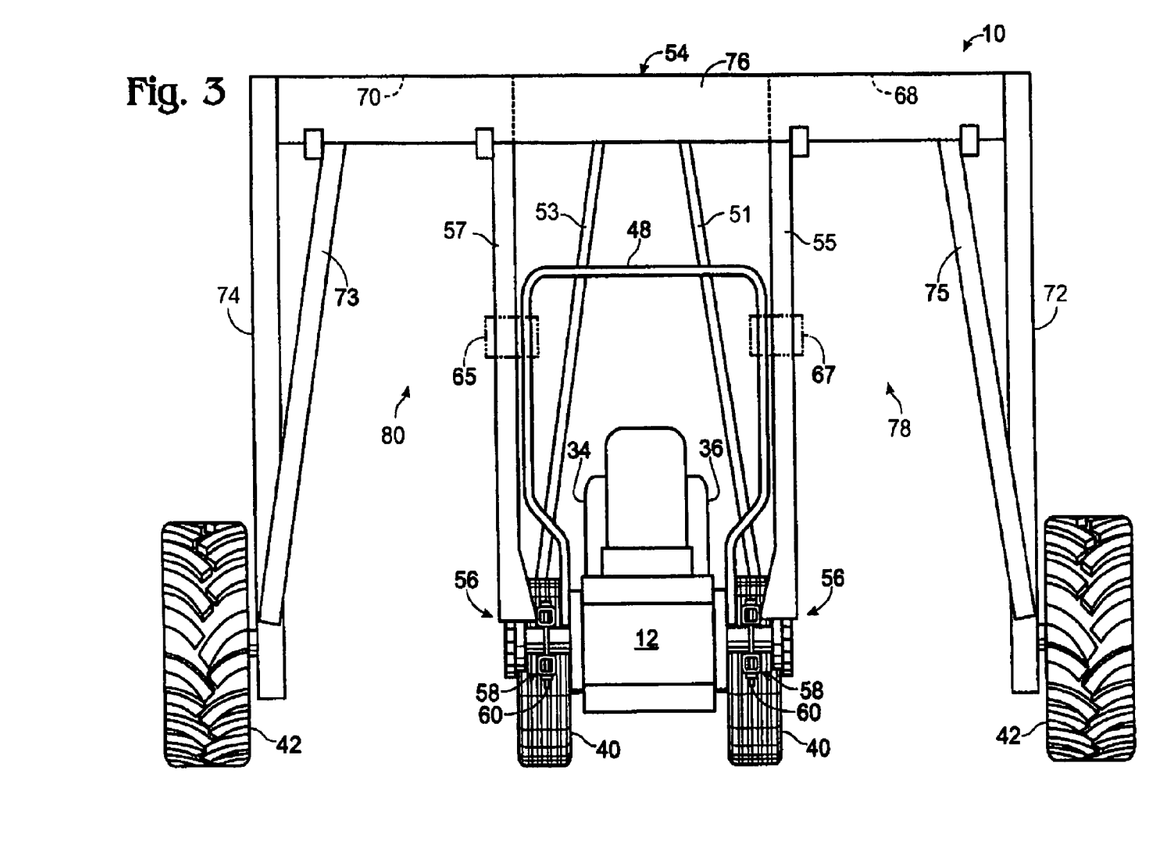
FIG. 3 is a rear view of the combination vehicle and conversion apparatus shown in FIG. 1.

FIG. 3 further illustrates the combination vehicle and conversion apparatus described above. Specifically, FIG. 3 is a rear view of conversion apparatus 10 coupled to vehicle 12. It should be noted that in some embodiments, the rear portion 54 of conversion apparatus 10 (including mounting members 55, 57 and support members 72, 74) may include a first extension 68 and a second extension 70. Extensions 68 and 70 may extend laterally from coupling members 55, 57 on opposing sides 34 and 36 of vehicle 12, as shown in FIG. 3. Extensions 68, 70 may be disposed above the vehicle to allow passage of high-clearance crops 14 underneath the extensions, as previously shown and described in relation to FIG. 1. It should be appreciated that in some embodiments, the height of extensions 68 and 70 may adjustable, such that the extension may be lowered towards the ground surface, or raised further from vehicle 12, depending on crop type and application desired.

Support members, or legs, may extend from each extension. For example, a first support member 72, or leg, may extend from first extension 68, and a second support member 74 may extend from second extension 70. It should be appreciated that extensions 68 and 70 may form a continuous unit, via a joinder portion 76 that links first support member 72 with second support member 74. Alternatively, extensions 68 and 70 may be independent from each other. As previously mentioned, conversion apparatus 10 may include accessory extensions that may be coupled to the support members 72, 74 or extensions 68, 70.

The resulting attachment of frame 50 of conversion apparatus 10 to vehicle 12 effectively creates passages 78 and 80, also referred to as a first pocket and a second pocket, respectively. As shown in FIG. 3, pocket 78 may be formed by support member 72, extension 68 and side 36 of vehicle 12 (and/or mounting member 55). Similarly, pocket 80 may be formed by support member 74, extension 70 and side 34 of vehicle 12 (and/or mounting member 57). Pockets 78, 80 may be sized to provide a space or passage for high-clearance crops 14 to pass as vehicle 12 travels within a crop row.

Figure 4:
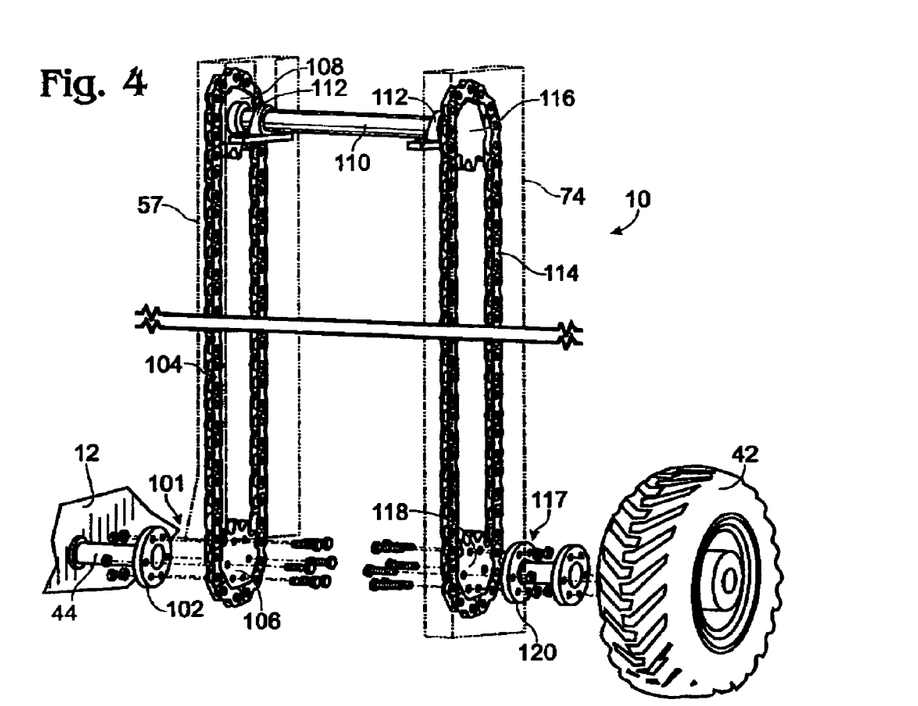
FIG. 4 is an exploded view of a drive linkage of the conversion apparatus shown in FIG. 1 according to an embodiment of the present invention.

As described above, support members 72, 74 may be coupled to vehicle 12 via mounting member 55, 57 through extension 68, 70, respectively. FIG. 4 illustrates in an exploded view of a drive linkage of conversion apparatus 10. The drive linkage may operatively couple the support members 72, 74 to mounting members 55, 57.

As shown in FIG. 4, vehicle 12 may include a rear axle 41 with a wheel hub 102. Reference indicator 101 generally indicates the point of attachment of mounting member 57 to vehicle 12. Specifically, mounting member 57 of conversion apparatus 10 may include a drive linkage with a drive chain 104 engaging a chain sprocket 106. Chain sprocket 106 may be configured to be selectively secured to wheel hub 102. For example, bolts or other fasteners may be used to secure chain sprocket 106 to wheel hub 102.

Drive chain 104 may be configured to rotate around first chain sprocket 106 and a second chain sprocket 108. Drive chain 104 may be operatively coupled to a second drive chain 114 through a drive shaft 110. Specifically, drive shaft 110 may be coupled to second chain sprocket 108 and a third chain sprocket 116. In some embodiments, one or more tensioners (indicated generally at 112 in the form of a clamp), such as a bolt, may be included to enable a user to adjust the tension of the drive linkage.

As illustrated, second drive chain 114 may rotate around third drive sprocket 116 and a fourth drive sprocket 118. The fourth drive sprocket may be selectively attached to a wheel 42 of the conversion apparatus via a wheel hub and frame axle 120, as indicated generally at 117. A similar arrangement may be used on the opposing side of the vehicle. Thus, wheels 42 may be operatively attached as drive wheels to the respective support members 72, 74, and regardless of whether wheels 42 are mounted on the vehicle or the conversion apparatus, the vehicle drive mechanism may be adapted to continue to drive the respective wheels 42. In other words, the drive force for the drive wheels of the vehicle is translated to the wheels on the conversion apparatus through a first and second chain drive.

It should be appreciated that wheel 42 may be removed from vehicle axle 41 and vehicle wheel hub 102 of vehicle 12 and selectively coupled to wheel hub and frame axle 120 of the conversion apparatus. In such a configuration, rear wheels 42 may be substantially spaced away from the body of vehicle 12. Thus, as shown in FIGS. 1–3, in an embodiment where there are two rear wheels, the first rear wheel may be selectively removed from the vehicle and attached to the first support member of the conversion apparatus and the second rear wheel may be removed from the vehicle and attached to the second support member of the conversion apparatus.

The spaced-apart configuration of the wheels from the vehicle body effectively narrows the width of a vehicle and may facilitate movement of a large vehicle within narrow crop rows. Typically, a user is prevented from using a vehicle with a wheel base which exceeds the crop row width. However, in the present embodiment, the rear wheels do not have to fit within the same crop row as the body of the vehicle. Thus, a vehicle with a rear wheel base which exceeds the crop row width may still be used in a narrow crop row, if upon removal of the wheels, the vehicle fits within a crop row. Since the wheels may be displaced from the vehicle body only the vehicle body must fit within the crop row. Thus, where before the size of a crop row may have restricted vehicle use to a fifteen-horsepower tractor, the present apparatus enables the use of a large vehicle, such as a thirty-horsepower tractor, because the rear wheels (typically the larger wheels with the larger wheel base) do not need to fit within the same row as the body of the vehicle. It should be noted that in some examples, front wheels 38 of the vehicle may be adjusted inward, narrowing the width of vehicle body 30 and possibly enabling the use of a larger vehicle.

As described above, in the illustrated embodiment, rear wheels 42 are maintained as the driven wheels regardless of whether the wheels are positioned on the vehicle or on the conversion apparatus. However, it should be appreciated that in some embodiments, the rear wheels may be non-driven wheels. Additionally, in some embodiments, the conversion apparatus may include a separate set of wheels, thus avoiding the necessity of removing the wheels from vehicle 12 unless desired. Moreover, in some embodiment, conversion apparatus 10 may enable the displacement of the front wheels instead of the rear wheels. Alternatively, the conversion apparatus may enable the displacement of both the front and rear wheels.

Figure 5:
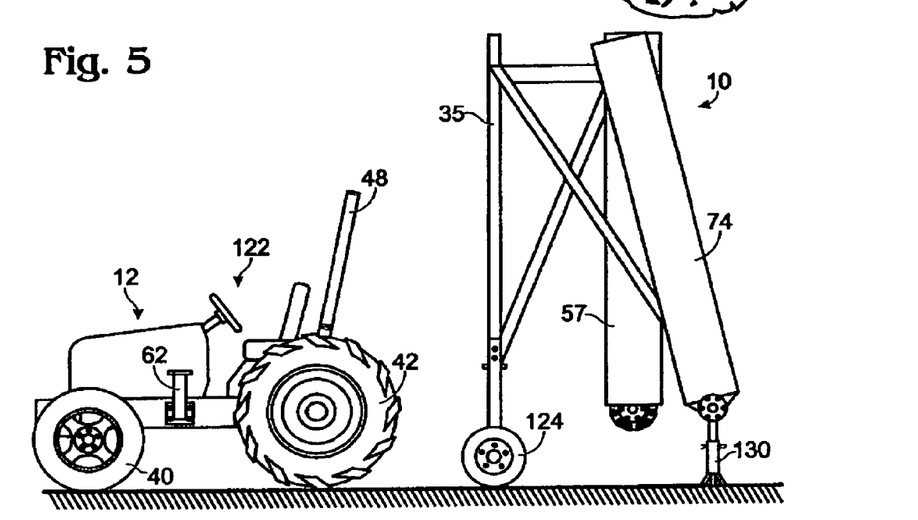
FIG. 5 is a side view of a vehicle and a conversion apparatus prior to attachment of the conversion apparatus to the vehicle.
Figure 6:
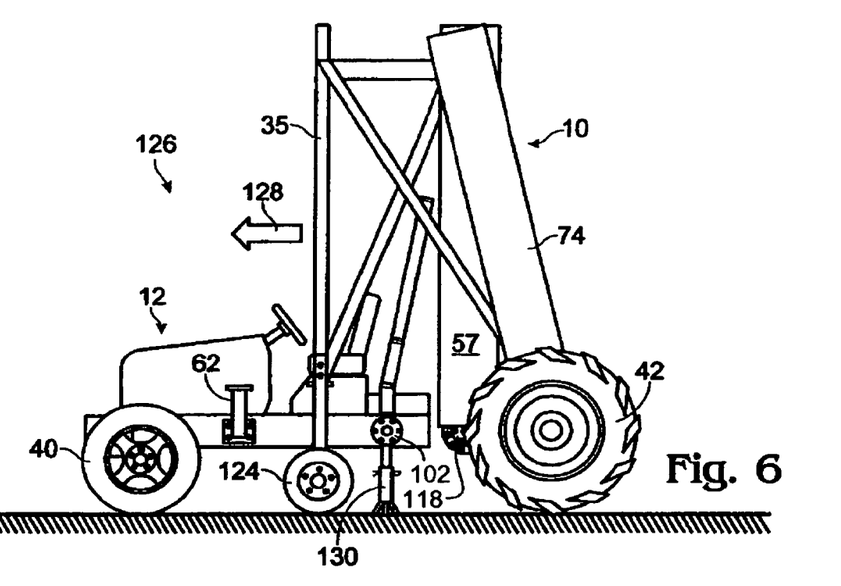
FIG. 6 is a side view of the conversion apparatus of FIG. 5 being moved into position for attachment to a vehicle.
Figure 7:
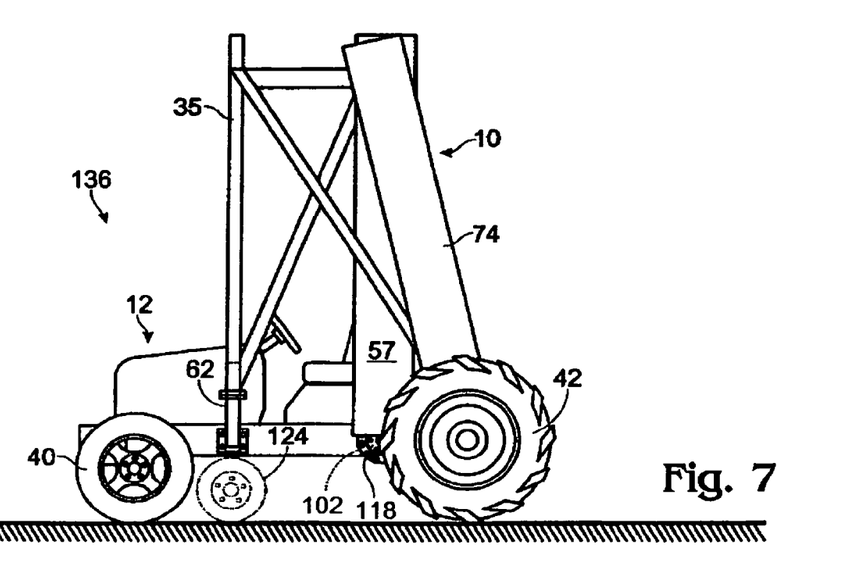
FIG. 7 is a side view of the vehicle and conversion apparatus of FIG. 6 after the conversion apparatus has been attached to the vehicle.

FIGS. 5–7 illustrate the attachment and detachment of conversion apparatus 10 to/from vehicle 12. Although one method of attaching/detaching a conversion apparatus to/from a vehicle, it should be appreciated that other mechanisms or methods may be used to attach/detach the conversion apparatus 10 to the vehicle 12 without departing from the scope of the invention. Moreover, although described in a set order, it should be appreciated that the order of the steps may be reversed, interchanged or altered, without departing from the scope of the invention.

FIG. 5 illustrates generally at 122, a vehicle 12 and a conversion apparatus 10 prior to attachment of conversion apparatus 10 to vehicle 12. As discussed above, typically vehicle 12 includes one or more front wheels 40 and one or more rear wheels 42. Vehicle 12 may further include a bracket 62. Bracket 62 may be integrated within vehicle 12 for attachment of other accessories, or may be selectively attached to vehicle 12 specifically for the attachment of conversion apparatus 10. Bracket 62 may be an L-shaped bracket or other suitable bracket adapted to receive one of front braces 33, 35 of conversion apparatus 10.

As described above, conversion apparatus 10 may include front braces 33, 35, coupling members 55, 57 and support members 72, 74. Only a single side of the vehicle and conversion apparatus is shown in FIGS. 5–7, but it should be appreciated that a similar arrangement may be disposed on the opposing side of the vehicle and conversion apparatus. Guide wheels 124 may be selectively attached to front braces 33, 35.

To prepare vehicle 12 for attachment of conversion apparatus 10, the rear wheels 42 may be removed from the vehicle axles. For example, a user may remove the rear wheel from each vehicle wheel hub and block, or otherwise support, the rear axle of the vehicle. For example, in FIG. 6, a support, such as a jack 130 may be used to hold rear axle and wheel hub 102 of vehicle 12 in position.

The wheels removed from vehicle 12 may be attached to the wheel hubs of the conversion apparatus. The wheels may be attached in a conventional manner used to attach wheels to vehicles. It should be appreciated that in some embodiments, the conversion apparatus may already have a set of wheels, and thus, only removal of wheels 42 from vehicle 12 is necessary.

Once wheels 42 are removed from vehicle 12 and attached to conversion apparatus 10 (if necessary), conversion apparatus 10 may be positioned for attachment to vehicle 12, as shown generally at 126 in FIG. 6. Specifically, conversion apparatus 10 may be rolled toward vehicle 12 as indicated by arrow 128. Removable guide wheels 124 may be adapted to facilitate movement of conversion apparatus 10. Vehicle 12 may remain fixed in position such that a user only needs to manipulate conversion apparatus 10.

The conversion apparatus may be positioned such that front braces 33, 35 are aligned with bracket 62, as shown generally at 136 in FIG. 7. A user may then secure front braces 33, 35 to bracket 62, thus securing the front portion of conversion apparatus 10 to vehicle 12. Once secured in place, guide wheels 124 may be removed from front braces 33, 35 (as indicated by dashed lines in FIG. 7).

As discussed above in relation to FIG. 4, coupling members 55, 57 may include a chain sprocket which may be attached to the vehicle wheel hubs where the rear wheels had been attached to the vehicle. For example, in FIG. 7, wheel sprocket 118 extending from mounting member 57 may be secured to wheel hub 102 of vehicle 12. Attachment of wheel sprocket 118 to wheel hub 102, (and attachment of the opposing side wheel sprocket to the opposing side wheel hub) enables wheels 42 to be driven although they are spaced apart from the body of vehicle 12. Additional fasteners may be attached to further secure conversion assembly 10 to the body of vehicle 12.

Removal of conversion apparatus 10 from vehicle 12 generally follows the steps outlined above in reverse order. Specifically, guide wheels 124 may be attached to front braces 33, 35. The fasteners securing conversion assembly to vehicle 12 may be released and the rear axles of vehicle 12 blocked. Conversion apparatus 10 may be rolled away from vehicle 12. A user may then remove the wheels from conversion apparatus 10 and reattach the wheels to the rear axle of vehicle 12, thus fully restoring the functionality of original vehicle 12.

It should be appreciated that the configuration of conversion apparatus 10 enables a user to maintain a low center of gravity when operating vehicle 12, thus providing stability to the combination vehicle and conversion apparatus. Thus, the conversion apparatus provides a means for preserving a vehicle at its original height above ground surface, without substantially raising the vehicle's center of gravity. The configuration of the frame also provides improved stability and a smoother ride compared to conventional tractors and other vehicles due to the configuration of spaced-apart rear wheels. With such improved stability, the combination vehicle and conversion apparatus may be used in a wide variety of settings, including use on hills, variable ground surfaces, etc.

In some embodiments, rear wheels 42 may be moved both outwardly away from the body of the vehicle and rearwardly from their initial position on the vehicle. Such adjustments of wheels 42 may improve the stability of vehicle 12 when conversion apparatus 10 is attached. Furthermore, a vehicle 12 with conversion apparatus 10 attached has a reduced turning radius in comparison to other high-clearance, high center-of-gravity tractors. Such a reduction in the turning radius is a result of substantially maintaining the front wheels proximal to the vehicle body, while extending the position of the rear wheels from the vehicle body.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein.

The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

What is claimed is:

1. A conversion apparatus for attachment to a vehicle, the conversion apparatus comprising:
a frame comprising:
a mounting assembly adapted to releasably couple the conversion apparatus to the vehicle;
a first extension and a second extension, each extension laterally extending from the mounting assembly on opposing sides of the vehicle;
a first support member extending from the first extension to form a first pocket between the vehicle and the first support member, and a second support member extending from the second extension to form a second pocket between the vehicle and the second support member; and
a guard extending in front of the vehicle and removably secured to the frame.

2. The conversion apparatus of claim 1, wherein both the first pocket and the second pocket are sized to provide a passage for vertically elongated crops.

3. The conversion apparatus of claim 1, wherein the first support member is adapted to travel down a first row, and the second support member is adapted to travel down a second row.

4. The conversion apparatus of claim 1, wherein the vehicle includes a body adapted to travel down a central row, the first support member is adapted to travel down a first side row, and the second support member is adapted to travel down a second side row.

5. The conversion apparatus of claim 1, wherein both the first extension and second extension are disposed above the vehicle.

6. The conversion apparatus of claim 1, wherein the first support member includes a first wheel and the second support member includes a second wheel.

7. The conversion apparatus of claim 6, wherein both the first wheel and the second wheel are driven wheels.

8. The conversion apparatus of claim 7, wherein the first wheel and the second wheel are driven by a drive linkage mounted within the frame and operatively connected to the vehicle.

9. The conversion apparatus of claim 1, wherein the frame includes at least one accessory extension adapted to receive at least one accessory.

10. The conversion apparatus of claim 9, wherein the at least one accessory extension is adapted to extend from the first support member to travel over an additional row.

11. The conversion apparatus of claim 6, wherein the first wheel and the second wheel are configured to be selectively positioned on the vehicle.

12. A conversion apparatus for a vehicle, wherein the vehicle includes a body and at least one front wheel and two removable rear wheels, the conversion apparatus comprising:
a first leg spaced away from the vehicle body and adapted to removably receive one of the two rear wheels of the vehicle;
a second leg spaced away from the vehicle body and adapted to removably receive the other of the two rear wheels of the vehicle;
an extension linking the first leg with the second leg; and
a mounting assembly coupled to the extension and adapted to be removably secured to the vehicle body.

13. The conversion apparatus of claim 12, wherein the first leg is adapted to travel down a first row, and the second leg is adapted to travel down a second row.

14. The conversion apparatus of claim 12, wherein the vehicle body is adapted to travel down a central row, the first leg is adapted to travel down a first row and the second leg is adapted to travel down a second row.

15. The conversion apparatus of claim 12, wherein the extension is disposed above the vehicle.

16. The conversion apparatus of claim 12, wherein the two rear wheels are driven wheels.

17. The conversion apparatus of claim 12, wherein at least one of the first leg and the second leg includes a drive chain adapted to drive one of the two rear wheels, and wherein the drive chain is operatively linked to a drive mechanism of the vehicle.

18. The conversion apparatus of claim 12, wherein the extension includes a first extension portion and a second extension portion such that the first leg is coupled to the first extension portion and the second leg is coupled to the second extension portion.

19. The conversion apparatus of claim 18, wherein the mounting assembly includes a first mounting member and a second mounting member, where the first mounting member is coupled to the first extension and the second mounting member is coupled to the second extension.

20. The conversion apparatus of claim 12, wherein the first leg and extension form a pocket at least a height of the vehicle.

21. The conversion apparatus of claim 12, wherein a position of the first leg is adjustable.

22. The conversion apparatus of claim 12, wherein one of a length or a height of the extension is adjustable.

23. The conversion apparatus of claim 12, wherein a height of the mounting assembly is adjustable.

24. A method of converting a vehicle having a body, a pair of wheels, and a pair of wheel hubs into a specialized vehicle, the method comprising:
removing the pair of wheels from the vehicle;
positioning a conversion apparatus over the body of the vehicle;
securing the conversion apparatus to the vehicle; and
attaching the pair of wheels to the conversion apparatus such that the pair of wheels are spaced substantially away from the body of the vehicle.

25. The method of claim 24, wherein the conversion apparatus comprises:
a mounting assembly adapted to releasably couple the conversion apparatus to the vehicle;
a first extension and a second extension, each extension laterally extending from the mounting assembly on opposing sides of the vehicle; and
a first support member extending from the first extension to form a first pocket between the vehicle and the first support member, and a second support member extending from the second extension to form a second pocket between the vehicle and the second support member.

26. The method of claim 24, wherein attaching the pair of wheels to the conversion apparatus includes operatively connecting the pair of wheels such that the wheels are driven wheels.

* * * * *